J. BUCKNER.
ATTACHING HUBS TO AXLES.
No. 184,582. Patented Nov. 21, 1876.
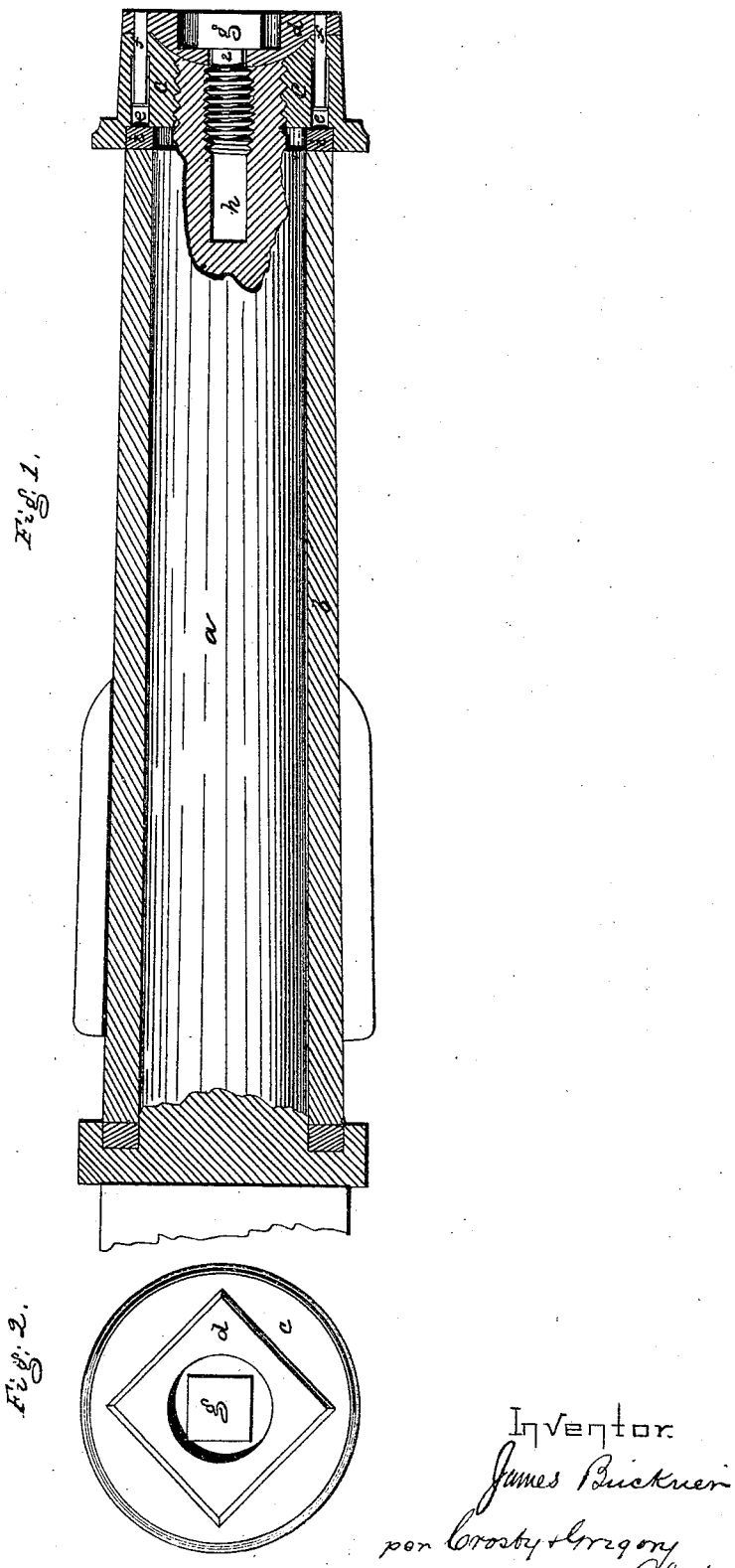
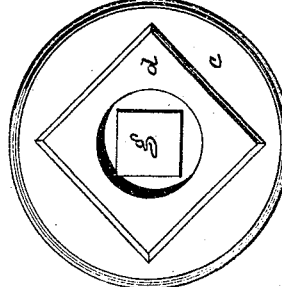
Witnesses.
L. H. Latimer
W. G. Pratt.
Inventor.
James Buckner
per Crosby & Gregory
Attys

UNITED STATES PATENT OFFICE

JAMES BUCKNER, OF BOSTON, MASSACHUSETTS.

IMPROVEMENT IN ATTACHING HUBS TO AXLES.

Specification forming part of Letters Patent No. 184,582, dated November 21, 1876; application filed July 28, 1876.

*To all whom it may concern:*

Be it known that I, JAMES BUCKNER, of Boston, in the county of Suffolk and State of Massachusetts, have invented an Improvement in Axles for Carriages, of which the following is a specification:

This invention relates to carriage-axles, and has reference to means for preventing the nuts at the ends of the axles from becoming loose and detached.

The invention consists of a carriage-axle and nut combined with a set-screw and movable cap, and headed connecting-pins, constructed substantially as hereinafter described, to act as locking devices for the nut, to prevent its accidental removal.

Figure 1 represents the invention in longitudinal section, and Fig. 2 an end view of the nut.

The nuts that hold the wheels on the axles of carriages are made with right and left hand threads, so that they will not run or turn off when the carriage moves forward, but will be turned up or tightened. If a carriage should be moved backward for any considerable distance, and the nuts should be loose, they would be turned off, and it often happens that loose nuts become detached from the axles even with little back movement of the carriage.

In this invention the axle-arm $a$ and box $b$ are of any usual construction, and the nuts $c$ (one on each arm of the forward and hind axle) are right and left screw-threaded, as usual. In the drawing, the nut $c$ is provided with a left-hand screw-thread, fitted to the screw-threaded projection or end of the arm. The forward end of the nut $c$ is, in this instance, countersunk at its center to receive a cap, $d$, and is provided, preferably, with two holes, $e$, to receive headed pins $f$, connected with the cap $d$, the pins permitting the cap to be moved in a right line through the action of a threaded bolt, $g$, fitted to a tapped hole, $h$, in the end of the axle-arm. The cap is fitted to a portion, 2, of the bolt $g$, so that it is moved out and in with the bolt; but it cannot be removed from the nut because of the heads formed on the pins $f$.

The nut $c$ is turned up against the usual washer $i$, and then the bolt $g$ is turned until the cap is forced into the recess in the end of the nut, or against the end of the axle, and in such position the cap and bolt set or lock the nut $c$, so that it cannot be turned in either direction without unscrewing the bolt.

It will be noticed that the cap is secured to the axle by a bolt with a right-hand screw-thread, or the converse of the screw-thread that connects the axle and nut, and the nut is connected with the cap by the pins, so that the nut cannot turn without the cap; but the cap can be moved toward or from the nut to hold it set, or to permit it to be moved longitudinally on its screw-thread at the end of the axle-arm.

The washers of carriages are frequently of different thicknesses, and when thicker than usual, and a nut of ordinary construction is turned up against such a washer, the nut may not bind the externally screw-threaded portion of the axle close enough to hold the wheel safely in position on the axle, and in such cases this cap and bolt to set the nut is of great importance. A washer of any thickness may be safely used. The nut may be made of malleable iron.

The cap may be made of iron, if desired, or of brass or other metal, and may be plated or otherwise properly finished, as may be the head of the nut $g$. This head and the nut $c$ may be quadrangular, octagonal, or of any desired usual shape; or the head $g$ may be slotted to receive a screw-driver.

The cap $d$ may be struck out of sheet metal, and ornamented in any usual way.

The headed pins prevent the cap and nut from becoming detached.

I claim—

The cap and headed guide-pins in combination, and connected with the bolt $g$, and applied to the nut and axle, all substantially as described.

In testimony whereof I have signed my name to this specification in the presence of two subscribing witnesses.

JAMES BUCKNER.

Witnesses:
WM. H. H. EMMONS,
W. J. PRATT.